(12) United States Patent
Sato et al.

(10) Patent No.: US 7,538,147 B2
(45) Date of Patent: May 26, 2009

(54) IMAGE FORMING METHOD, PATTERN FORMING METHOD AND LIQUID-APPLYING APPARATUS WHICH MAKE USE OF LIQUID COMPOSITIONS

(75) Inventors: Koichi Sato, Atsugi (JP); Ikuo Nakazawa, Kawasaki (JP); Ryuji Higashi, Kawasaki (JP); Sakae Suda, Yokohama (JP); Masayuki Ikegami, Atsugi (JP); Keiichiro Tsubaki, Kawasaki (JP); Keiko Yamagishi, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 474 days.

(21) Appl. No.: 10/557,236

(22) PCT Filed: Mar. 2, 2005

(86) PCT No.: PCT/JP2005/004031

§ 371 (c)(1),
(2), (4) Date: Nov. 17, 2005

(87) PCT Pub. No.: WO2005/085370

PCT Pub. Date: Sep. 15, 2005

(65) Prior Publication Data

US 2006/0221117 A1 Oct. 5, 2006

(30) Foreign Application Priority Data

Mar. 5, 2004 (JP) .............................. 2004-062968

(51) Int. Cl.
*C09D 11/00* (2006.01)
(52) U.S. Cl. ...................... 523/160; 347/100
(58) Field of Classification Search .............. 106/31.13, 106/218; 523/160; 524/366; 347/1, 54, 347/56, 68, 73, 100, 112
See application file for complete search history.

(56) References Cited

U.S. PATENT DOCUMENTS 4,313,124 A 1/1982 Hara ...................... 346/140 R (Continued)

FOREIGN PATENT DOCUMENTS

EP 1 243 624 A1 9/2002

(Continued)

OTHER PUBLICATIONS

Sadahito Aoshima et al., "Living Cationic Polymerization of Vinyl Monomers by Organoaluminium Halides," Polymer Bulletin, vol. 15, No. 5, pp. 417-423 (1986).
Sep. 14, 2006 International Preliminary Report on Patentability (Chapter I) in International PCT Patent Appln. No. PCT/JP2005/004031.

*Primary Examiner*—David Wu
*Assistant Examiner*—Vu Nguyen
(74) *Attorney, Agent, or Firm*—Fitzpatrick, Cella, Harper & Scinto

(57) ABSTRACT

An image forming method which imparts two or more kinds of liquid compositions onto a recording medium to form an image thereon, the image forming method comprising the steps of: preparing plural liquid compositions including a first liquid composition containing a functional substance, an anionic amphiphilic polymer, and a liquid medium, and a second liquid composition containing a functional substance, a polyvalent cation, an anionic amphiphilic polymer, and a liquid medium, at least one of the polymer in the first composition and the polymer in the second composition being a block polymer or a graft polymer, and imparting the first and second compositions onto the medium to bring the first and second compositions into contact with each other to cause at least one to thicken.

10 Claims, 1 Drawing Sheet

U.S. PATENT DOCUMENTS

| | | | |
|---|---|---|---|
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 5,250,107 A * | 10/1993 | Bares | 106/31.27 |
| 5,320,668 A | 6/1994 | Shields et al. | 106/20 R |
| 5,428,383 A * | 6/1995 | Shields et al. | 347/96 |
| 5,958,121 A * | 9/1999 | Lin | 106/31.43 |
| 6,084,619 A * | 7/2000 | Takemoto et al. | 347/96 |
| 6,281,267 B2 | 8/2001 | Parazak | 523/160 |
| 7,004,579 B2 | 2/2006 | Sato et al. | 347/105 |
| 7,056,972 B2 | 6/2006 | Nakazawa et al. | 524/505 |
| 7,067,590 B2 | 6/2006 | Sato et al. | 525/299 |
| 7,151,156 B2 * | 12/2006 | Sato et al. | 528/86 |
| 2002/0180854 A1 * | 12/2002 | Sato et al. | 347/96 |
| 2002/0186288 A1 * | 12/2002 | Nakazawa et al. | 347/100 |
| 2003/0236343 A1 * | 12/2003 | Sato et al. | 524/539 |
| 2005/0131102 A1 | 6/2005 | Nakazawa et al. | 523/160 |
| 2005/0140762 A1 | 6/2005 | Sato et al. | 347/100 |
| 2005/0197424 A1 | 9/2005 | Higashi et al. | 523/160 |
| 2005/0209367 A1 | 9/2005 | Sato et al. | 523/161 |
| 2005/0219277 A1 | 10/2005 | Sato et al. | 347/1 |
| 2005/0239918 A1 | 10/2005 | Nakazawa et al. | 523/160 |
| 2005/0249925 A1 | 11/2005 | Ikegami et al. | 428/195.1 |
| 2006/0004124 A1 | 1/2006 | Tsubaki et al. | 523/160 |
| 2006/0047015 A1 | 3/2006 | Duda et al. | 523/160 |
| 2006/0050117 A1 | 3/2006 | Sato et al. | 347/100 |
| 2006/0057485 A1 | 3/2006 | Teshima et al. | 430/108.8 |
| 2006/0100310 A1 | 5/2006 | Nakazawa et al. | 523/160 |
| 2006/0128828 A1 | 6/2006 | Sato et al. | 523/160 |
| 2006/0144287 A1 | 7/2006 | Tsubaki et al. | 106/31.13 |
| 2006/0146087 A1 | 7/2006 | Sato et al. | 347/21 |
| 2006/0148997 A1 | 7/2006 | Sato et al. | 525/299 |
| 2006/0160975 A1 | 7/2006 | Suda et al. | 526/330 |
| 2006/0178468 A1 | 8/2006 | Sato et al. | 524/556 |
| 2006/0221117 A1 | 10/2006 | Sato et al. | 347/21 |
| 2006/0235177 A1 | 10/2006 | Ikegami et al. | 526/287 |
| 2006/0250463 A1 | 11/2006 | Nakazawa et al. | 347/100 |
| 2006/0281853 A1 | 12/2006 | Yamagishi et al. | 524/547 |
| 2007/0015856 A1 | 1/2007 | Sato et al. | 524/80 |
| 2007/0032570 A1 | 2/2007 | Sato et al. | 523/160 |

FOREIGN PATENT DOCUMENTS

| | | |
|---|---|---|
| EP | 1 245 396 A2 | 10/2002 |
| EP | 1 357 138 A1 | 10/2003 |
| JP | S59-123670 | 7/1984 |
| JP | S59-138461 | 8/1984 |
| JP | H11-080221 | 3/1999 |
| JP | H11-322866 | 11/1999 |
| JP | H11-322942 | 11/1999 |
| WO | WO 2004/005362 A2 | 1/2004 |
| WO | WO 2005/0124446 A1 | 2/2005 |

* cited by examiner

IMAGE FORMING METHOD, PATTERN FORMING METHOD AND LIQUID-APPLYING APPARATUS WHICH MAKE USE OF LIQUID COMPOSITIONS

TECHNICAL FIELD

This invention relates to an image forming method, and a pattern forming method and a liquid-applying apparatus, in which colors are kept from blurring due to contact between liquid compositions containing functional substances, and which promises good fixing performance of the functional substances on recording mediums.

BACKGROUND ART

In aqueous dispersion materials containing functional substances, it is conventionally well known to contain, as functional materials, agricultural chemicals such as herbicides and insecticides; pharmaceuticals such as carcinostatics, antialergic agents and antiphlogistics; and materials for coloring, such as inks and toners having coloring materials.

In recent years, digital printing technique is making very dramatic progress. This digital printing technique is, as its typical example, what is called electrophotographic technique or ink jet technique, and is more and more making its presence felt as an image forming technique in offices, homes and so forth. Meanwhile, a trend toward the use of such an image forming technique in the fabrication of devices such as semiconductor devices and display devices is also becoming active, and this technique is being widely developed not only in image formation but also in industrial uses.

In particular, the ink jet technique has great characteristic features that it can enjoy compactness and low power consumption as a direct recording method. Also, image quality is being rapidly made higher as nozzles are made finer. An example of the ink jet technique is a method in which an ink fed from an ink tank is heated with heaters in nozzles to cause evaporation to bubbling, whereupon the ink is ejected to form images on a recording medium. Another example is a method in which the ink is ejected from nozzles by vibrating piezoelectric elements.

As inks used in such methods, aqueous dye solutions are usually used, and hence colors may blur when they are superimposed, or a phenomenon called feathering may come in the direction of fibers of paper at recorded areas on a recording medium. Also, since dyes are chiefly used as coloring materials, it is earnestly demanded to improve weatherability. For the purpose of making improvements on these, an example is found in which the reaction of a dye ink with a pigment ink is utilized (U.S. Pat. No. 5,320,668). An example is also found in which a reactive self-dispersible pigment is used (U.S. Pat. No. 6,281,267).

DISCLOSURE OF THE INVENTION

The present invention has been made taking account of such background technique, and intends to enable good image formation or pattern formation on a recording medium by using two or more kinds of liquid compositions different in properties, containing functional substances, and by bringing such liquid compositions into contact with one another to cause the liquid compositions to thicken.

The present invention also intends to provide, using such a method of forming images on a recording medium, a better pattern forming method which enables functional substances to be kept from being mixed on the recording medium, and achieves good fixing performance on recorded areas.

The present invention still also intends to provide a liquid-applying apparatus used in such a good pattern forming method, which makes use of such a method of forming images on a recording medium.

The image forming method provided by the present invention is an image forming method which imparts two or more kinds of liquid compositions onto a recording medium to form an image on the recording medium, the method comprising the steps of:

preparing a plurality of liquid compositions which include at least a first liquid composition containing a functional substance, an anionic amphiphilic polymer and a liquid medium and a second liquid composition containing a functional substance, a polyvalent cation, an anionic amphiphilic polymer and a liquid medium; at least one of the polymer in the first liquid composition and the polymer in the second liquid composition being a block polymer or a graft polymer; and imparting the first liquid composition and the second liquid composition onto the recording medium to bring the first liquid composition and the second liquid composition into contact with each other to cause at least one of these liquid compositions to thicken.

In the present invention, the polyvalent cation of the second liquid composition may be a metallic cation.

The polymers in the first and second liquid compositions both may be block polymers.

The present invention may further embrace an embodiment in which the functional substance is kept enclosed by the amphiphilic polymer.

The present invention may also embrace an embodiment in which an organic acid formed by protonation to the anion of the anionic amphiphilic polymer in the second liquid composition has a pKa of 2 or less.

The organic acid may also be a halogen-substituted benzoic acid group or a sulfonic acid group.

The present invention may also embrace an embodiment in which the anionic amphiphilic polymer in the second liquid composition contains a dioxyethylene unit structure.

In the present invention, the anion of the anionic amphiphilic polymer in the first liquid composition may also be a carboxylate anion.

The present invention may also embrace an embodiment in which the amphiphilic polymer contains a repeating structure of a monomer unit composed of an alkenyl ether.

The functional substance may also be a coloring material.

The pattern forming method also provided by the present invention is a pattern forming method which imparts a liquid composition containing a functional substance, to a pattern forming medium to form a pattern consisting of areas to which the functional substance has adhered, the method comprising the steps of:

preparing a plurality of liquid compositions which include at least a first liquid composition containing a functional substance, an anionic amphiphilic polymer and a liquid medium and a second liquid composition containing a functional substance, a polyvalent cation, an anionic amphiphilic polymer and a liquid medium; at least one of the polymer in the first liquid composition and the polymer in the second liquid composition being a block polymer or a graft polymer; and imparting the first liquid composition and the second liquid composition onto the pattern forming medium to bring the first liquid composition and the second liquid composition into contact with each other to cause at least one of these liquid compositions to thicken.

Then, the liquid compositions may be imparted by employing an ink-jet recording system.

The liquid-applying apparatus still also provided by the present invention comprises:

a liquid-applying means for causing energy to act on a plurality of liquid compositions to impart the plurality of liquid compositions onto a recording medium; the liquid compositions including at least a first liquid composition containing a functional substance, an anionic amphiphilic polymer and a liquid medium and a second liquid composition containing a functional substance, a polyvalent cation, an anionic amphiphilic polymer and a liquid medium; at least one of the polymer in the first liquid composition and the polymer in the second liquid composition being a block polymer or a graft polymer; and the first liquid composition and the second liquid composition being brought into contact with each other to cause at least one of these liquid compositions to thicken; and a driving means for driving the liquid-applying means.

The present invention can provide a recording method which makes use of two or more kinds of liquid compositions different in properties, containing functional substances, and brings these liquid compositions into contact with one another to cause the liquid compositions to thicken, to thereby enable good image formation or pattern formation on a recording medium on account of the functional substances.

The present invention can also provide, using such a method of forming images on a recording medium, a better pattern forming method which enables functional substances to be kept from being mixed on the recording medium, and achieves good fixing performance on recorded areas.

The present invention can still also provide a liquid-applying apparatus used in such a good pattern forming method, which makes use of such a method of forming images on a recording medium.

BEST MODE FOR CARRYING OUT THE INVENTION

Figure 1:
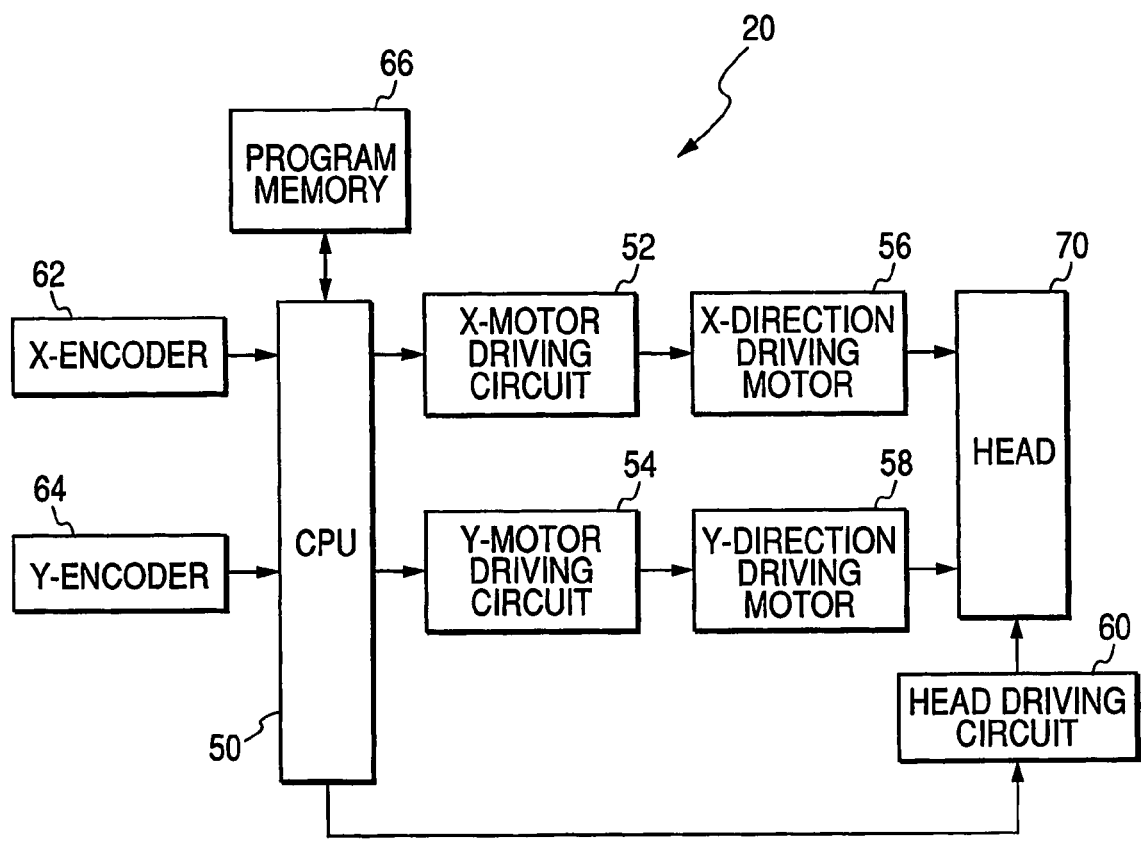
FIG. 1 is a block diagram showing the construction of an ink-jet recording apparatus.

The image forming method of the present invention is an image forming method which imparts two or more kinds of liquid compositions onto a recording medium to form an image on the recording medium, the method comprising the steps of:

preparing a plurality of liquid compositions which include at least a first liquid composition containing a functional substance, an anionic amphiphilic polymer and a liquid medium and a second liquid composition containing a functional substance, a polyvalent cation, an anionic amphiphilic polymer and a liquid medium; at least one of the polymer in the first liquid composition and the polymer in the second liquid composition being a block polymer or a graft polymer; and imparting the first liquid composition and the second liquid composition onto the recording medium to bring the first liquid composition and the second liquid composition into contact with each other to cause at least one of these liquid compositions to thicken.

In the method of forming images on a recording medium according to the present invention, a combination of two kinds of liquid compositions may be employed which causes at least one of the liquid compositions to thicken at least at its areas coming into contact with the other one when both are brought into contact with each other. Further, in the liquid compositions in such a combination, two or more kinds of liquid compositions may be included. For example, where they consist of three kinds of liquid compositions, what may be exemplified is one in which the first liquid composition and the second liquid composition constitute the combination showing the above relationship and the second liquid composition and the third liquid composition constitute the combination satisfying the above relationship.

Each liquid composition is so constituted that a functional substance and an amphiphilic polymer are contained in a liquid medium.

The functional substance according to the present invention is meant to be a compound or composition which exhibits the desired function. It may include, e.g., agricultural chemicals such as herbicides and insecticides; pharmaceuticals such as carcinostatics, antialergic agents and antiphlogistics; and coloring material as typified by pigments or dyes. For example, in the case of the agricultural chemicals, it includes active compounds having a herbicidal effect, and active compounds having an insecticidal effect. Also, in the case of the pharmaceuticals, it includes compounds which mitigate or remit symptoms to be remedied. In the present invention, the substances having such functions are improved in their fixability and position selectivity on areas where their functions are to be exhibited, to thereby make the functions brought out with ease.

In the present invention, it is especially effective when the functional substance is a coloring material. The coloring material may include particulate solids like pigments, and dye compounds.

The coloring material includes, as an example, the pigments as mentioned above, which may include inorganic achromatic pigments, and organic or inorganic chromatic pigments. Colorless or pale-color pigments, metalescent pigments or the like may also be used. Also usable are pigments newly synthesized for the sake of the present invention. As examples, the pigments may include the following.

As a black pigment, it may include, but is not limited to, RAVEN 1060, RAVEN 1080 and RAVEN 1170 (the foregoing are available from Columbian Carbon Japan Limited); BLACK PEARLS L, MOGUL-L and REGAL 400R (the foregoing are available from Cabot Corp.); COLOR BLACK FW1, COLOR BLACK FW2 and COLOR BLACK FW200 (the foregoing are available from Degussa Corp.); and MA7, MA8 and MA100 (the foregoing are available from Mitsubishi Chemicals, Inc.).

As a cyan pigment, it may include, but is not limited to, C.I. Pigment Blue 1, C.I. Pigment Blue 2, C.I. Pigment Blue 3, C.I. Pigment Blue 15, C.I. Pigment Blue 15:2 and C.I. Pigment Blue 15:3.

As a magenta pigment, it may include, but is not limited to, C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122 and C.I. Pigment Red 123.

As a yellow pigment, it may include, but is not limited to, C.I. Pigment Yellow 12, C.I. Pigment Yellow 74, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128 and C.I. Pigment Yellow 129.

Like the pigments, dyes may also be used in the present invention. Usable dyes may be known ones or novel ones, and usable are, e.g., water-soluble dyes such as direct dyes, acid dyes, basic dyes, reactive dyes and food dyes, and fat-soluble (oil-soluble) dyes, or insoluble dyes such as disperse dyes, which are as described below. The dyes may also be used in the state they have been made into solids. In this regard, oil-soluble dyes may be used, for example. As examples, they may include C.I. Solvent Blue 33, 38; C.I. Solvent Red 25, 31; and C.I. Solvent Yellow 1, 49.

Water-soluble dyes may also be used, which may include, as examples thereof, direct dyes such as C.I. Direct Black 17, 19, 22; C.I. Direct Yellow 12, 24, 26; C.I. Direct Red 1, 4, 13; C.I. Direct Blue 6, 22, 25; C.I. Direct Orange 34, 39; C.I. Direct Violet 47; C.I. Direct Brown 109; and C.I. Direct Green 59; acid dyes such as C.I. Acid Black 2; C.I. Acid Yellow 11, 17; C.I. Acid Red 1, 6; C.I. Acid Blue 9, 22; C.I. Acid Orange 7, 19; and C.I. Acid Violet 49; reactive dyes such as C.I. Reactive Black 1, 5; C.I. Reactive Yellow 2, 3; C.I. Reactive Red 3, 13, 16, 21; C.I. Reactive Blue 2, 3, 5; C.I. Reactive Orange 5, 7; C.I. Reactive Violet 1, 4; C.I. Reactive Green 5, 8; and C.I. Reactive Brown 2; basic dyes such as C.I. Basic Black 2; C.I. Basic Red 1, 2, 9, 12, 13, 14, 27; C.I. Basic Blue 1, 3, 5, 7, 9, 24, 25, 26, 28, 29; C.I. Basic Violet 7, 14, 27; and food dyes such as C.I. Food Black 1, 2.

As the oil-soluble dyes, commercially available products are exemplified below.

As a black oil-soluble dye, it may include, but is not limited to, C.I. Solvent Black 3, 22:1, 50.

As a yellow oil-soluble dye, it may include, but is not limited to, C.I. Solvent Yellow 1, 25:1, 172.

As an orange oil-soluble dye, it may include, but is not limited to, C.I. Solvent Orange 1, 40:1, 99.

As a red oil-soluble dye, it may include, but is not limited to, C.I. Solvent Red 1, 111, 229.

As a violet oil-soluble dye, it may include, but is not limited to, C.I. Solvent Violet 2, 11, 47.

As a blue oil-soluble dye, it may include, but is not limited to, C.I. Solvent Blue 2, 43, 134.

As a green oil-soluble dye, it may include, but is not limited to, C.I. Solvent Green 1, 20, 33.

As a blown oil-soluble dye, it may include, but is not limited to, C.I. Solvent Blown 1, 12, 58.

Incidentally, these examples of the coloring materials described above are particularly preferred for the liquid compositions in the present invention. The coloring material used in the present invention is not particularly limited to the above coloring materials.

The functional substance may preferably be contained in an amount of from 0.01 to 80% by weight based on the total weight of the liquid composition. In the case when two or more kinds of functional substances are used, it is preferable for their total weight to be so set as to be within this range. If the functional substance is in an amount of less than 0.01% by weight, no more sufficient image density may be achievable. If it is in an amount of more than 80% by weight, it may show a poor dispersibility. As a more preferable range, it may be in an amount ranging from 0.1% by weight to 50% by weight. As a still more preferable range, it may be in an amount ranging from 0.3% by weight to 30% by weight.

The liquid compositions in the present invention also each contain a liquid medium. There are no particular limitations on the liquid medium to be contained in the liquid compositions in the present invention. It is meant to be a liquid medium capable of dissolving, suspending or dispersing the components to be contained in the liquid composition. In the present invention, water-insoluble organic solvents or water-soluble organic solvents such as various kinds of straight-chain, branched or cyclic aliphatic hydrocarbons, aromatic hydrocarbons and heterocyclic aromatic hydrocarbons, and water may be used as the liquid medium. Of course, a mixed solvent of any of these may also be used.

In particular, water and an aqueous liquid medium composed of water and a water-soluble organic solvent may preferably be used in the liquid compositions in the present invention. As examples of the water-soluble organic solvent, it may include, e.g., polyhydric alcohols such as ethylene glycol, diethylene glycol, triethylene glycol, polyethylene glycol, propylene glycol, polypropylene glycol and glycerol; polyhydric alcohol ethers such as ethylene glycol monomethyl ether, ethylene glycol monoethyl ether, ethylene glycol monobutyl ether, diethylene glycol monoethyl ether and diethylene glycol monobutyl ether; and nitrogen-containing solvents such as N-methyl-2-pyrrolidone, substituted pyrrolidone, and triethanolamine. Also, monohydric alcohols such as methanol, ethanol and isopropyl alcohol may also be used, and two or more of any of these may also be used in combination as occasion calls.

With regard to the pH of the aqueous liquid medium as well, the liquid compositions may be used in all pH ranges, and may preferably be used in a pH range of from 1 to 14. The liquid medium to be contained in the liquid compositions used in the present invention may be in a content selected from a range of from 0.9% by weight or more to 99% by weight or less, and preferably from 10% by weight or more to 99% by weight or less. If it is in a content of less than 0.9% by weight, the liquid compositions may have too high viscosity. If it is in a content of more than 99% by weight, the functional substance may be unable to exhibit its function sufficiently.

As the amphiphilic polymer used in the liquid compositions in the present invention, a block polymer or a graft polymer may be used. If necessary, two or more kinds of amphiphilic polymers may be used in combination in the same liquid composition. The block polymer referred to in the present invention is a copolymer in which polymer units consisting of different repeating structural units, i.e., block segments, are bonded through covalent bonds, and is also called a block copolymer.

In the present invention, it is characterized by using the amphiphilic polymer. "Amphiphilic" refers to the property to have both a moiety having hydrophilicity and a moiety having lipophilicity. For example, where the medium is water, an amphiphilic substance forms micelle particles, and the particles are observable.

The block polymer is a polymer also called a block copolymer, in which polymers with different segment structures are bonded in a chain through covalent bonds. Also, the graft polymer used in the present invention is a polymer in which two polymer chains are bonded in a branch. For example, it is an amphiphilic graft polymer when the backbone and the branch differently have hydrophilicity and lipophilicity, or vice versa. The graft polymer is also called a graft copolymer. Typically, it is a polymer in which polymers with different segment structures are bonded in T-shapes through covalent bonds.

A block polymer which is a component more characteristically used in the present invention is described next. As a block polymer usable in the present invention, usable are conventionally known block polymers such as, to give specific examples, acrylic or methacrylic block polymers, block polymers of polystyrene and other addition polymerization type or condensation polymerization type polymer, and block polymers having a polyoxyethylene or polyoxyalkylene block(s). In the present invention, the block polymer may more preferably have a block form such as AB, ABA or ABD. A, B and D each represent a different block segment. In view of an advantage that a good state of enclosure of the functional substance can be formed, an ABD block polymer is preferred, and an ABD block polymer in which hydrophobic, hydrophilic and hydrophilic block segments are formed in the order of ABD is more preferred. It is further preferable that, of such hydrophobic, hydrophilic and hydrophilic block segments, the B segment has nonionic hydrophilicity and the D segment has ionic hydrophilicity.

In the present invention, the block polymer may also be bonded to a certain polymer chain in a T-shape to form a graft polymer. Also, each segment of the block polymer may be a copolymer segment, or, without limitations on the form of such copolymerization, may be a random segment or a gradient segment, for example.

In the present invention, preferably used is a block polymer containing a polyalkenyl ether structure. Particularly preferably used is a block polymer containing a polyvinyl ether structure. Methods for synthesizing the block polymer containing a polyalkanyl ether structure that may preferably be used in the present invention are reported in a large number (see, e.g., Japanese Patent Application Laid-open No. H11-080221). For example, a method by cationic living polymerization by Aoshima et al. (Polymer Bulletin Vol. 15, 1986, p. 417; Japanese Patent Applications Laid-open No. H11-322942 and No. H11-322866) is typical. Where polymers are synthesized by cationic living polymerization, copolymers composed of homopolymers or two or more components of monomers and also various polymers such as block polymers, graft polymers and gradient polymers can be synthesized in lengths (molecular weights) uniformed accurately. Also, as to polyalkenyl ethers, various functional groups can be introduced into their side chains. Cationic polymerization may besides be carried out in an HI/$I_2$ system, an HCl/$SnCl_4$ system or the like.

The structure of the block polymer containing a polyalkenyl ether structure may also be a copolymer composed of a vinyl ether and other polymer. Preferably used is a block polymer having a polyvinyl ether structure as a repeating structural unit.

An example of the repeating structural unit of the block polymer containing a polyvinyl ether structure is represented by the following general formula (1):

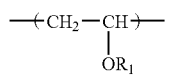

wherein $R_1$ represents a straight-chain, branched or cyclic alkyl group having 1 to 18 carbon atoms, or is selected from —CH($R_2$)—CH($R_3$)—O)$_l$—$R_4$ and —(CH$_2$)$_m$—(O)$_n$—$R_4$; where l and m are each independently selected from integers of 1 to 12, and n is 0 or 1, $R_2$ and $R_3$ are each independently a hydrogen atom or $CH_3$, $R_4$ represents a hydrogen atom, a straight-chain, branched or cyclic alkyl group having 1 to 6 carbon atoms, -Ph, -Pyr, -Ph-Ph, -Ph-Pyr, —CHO, —CH$_2$CHO, —CO—CH═CH$_2$, —CO—C(CH$_3$)═CH$_2$ or —CH$_2$COOR$_5$, and, where $R_4$ is other than a hydrogen atom, a hydrogen atom on a carbon atom may be substituted with a straight-chain or branched alkyl group having 1 to 4 carbon atoms, or F, Cl or Br, and a carbon atom in the aromatic ring may be substituted with a nitrogen atom, and $R_5$ is a hydrogen atom or an alkyl group having 1 to 5 carbon atoms.

Incidentally, the above -Ph, -Pyr, -Ph-Ph, -Ph-Pyr represent a phenyl group, a pyridyl group, a biphenyl group and a pyridylphenyl group, respectively. As to the pyridyl group, the biphenyl group and the pyridylphenyl group, these may be any of possible position isomers.

The repeating structural unit represented by the general formula (1) may preferably be used in the A or B segment of the ABD tri-block polymer used preferably in the present invention.

As specific examples of the repeating structural unit represented by the general formula (1), it may include the following.

Incidentally, shown below are structures of only the side chain —OR$_1$ group bonded to the —(CH$_2$—CH)— of the repeating structural unit represented by the general formula (1).

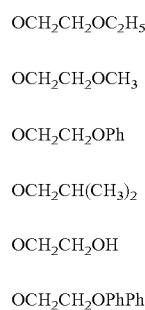

(Ph represents a phenylene or phenyl group.)

The amphiphilic block polymer may be obtained by, e.g., selecting and synthesizing a hydrophobic block segment and a hydrophilic block segment. Also, in the case of the graft polymer, the amphiphilic polymer may be obtained by, e.g., graft-bonding a hydrophobic block segment to a hydrophilic block segment.

Examples of a repeating structural unit having a functional group in the form of an organic acid or a salt of the organic acid, used characteristically in the present invention, is described next.

Specific examples of the repeating structural unit of the polyalkenyl ether used preferably as an anionic segment are given below.

Such examples may include repeating structural units represented by the following general formulas (2), (3), (4), (5) and (6).

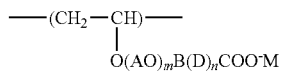

wherein A represents a substituted or unsubstituted straight-chain or branched alkylene group having 1 to 15 carbon atoms; m represents an integer of 0 to 30, and, when m is plural, each A represents the above group independently; B represents a single bond or a substituted or unsubstituted alkylene group; D represents an aromatic ring structure; n represents an integer of 1 to 10, and, when n is plural, each D represents the above group independently; and M represents a monovalent or polyvalent metallic cation.

The substituent the alkylene group represented by A and B in the general formula (2) may have may include an alkyl group or the like. The aromatic ring structure represented by D may include phenylene and naphthylene.

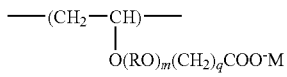

wherein R represents a substituted or unsubstituted straight-chain or branched alkylene group having 1 to 15 carbon atoms; m represents an integer of 0 to 30, and, when m is plural, each R represents the above group independently; q represents an integer of 1 to 30; and M represents a monovalent or polyvalent metallic cation.

Incidentally, the monovalent metallic cation represented by M in the general formulas (2) and (3) may include a sodium ion, a potassium ion and a lithium ion.

The polyvalent metallic cation represented by M in the general formulas (2) and (3) may include divalent cations such as Ca, Cu, Mg, Ni, Zn, Fe and Co; and trivalent cations such as Al, Nd, Y, Fe and La. As a non-metallic cation, it may include a diammonium cation and a triammonium cation.

Specific examples of the repeating structural unit represented by the general formula (2) are shown below.

Incidentally, shown below are structures of only the side chain $-O(AO)_m B(D)_n COO^- M$ group bonded to the $-(CH_2-CH)-$ of the repeating structural unit represented by the general formula (2).

$OCH_2CH_2OPhCOO^- M$ $OCH_2CH_2PhCOO^- M$ $OCH_2CH_2OPhPhCOO^- M$ $OCH_2CH_2ONpCOO^- M$ $OCH_2CH_2CH_2OPhCOO^- M$ $OCH_2CH(CH_3)OPhCOO^- M$ $OCH_2CH_2O(CH_2)_{20}PhCOO^- M$ $O(CH_2CH_2O)_2(CH_2)_2PhCOO^- M$ $O(CH_2CH_2O)_3(CH_2)_3PhCOO^- M$ $O(CH_2CH_2O)_{10}PhCOO^- M$ $O(CH_2CH_2O)_{20}PhCOO^- M$ $O(CH_2CH_2O)_2(CH_2)_6OPhCOO^- M$ $O(CH_2CH_2O)_5(CH_2)_7OPhCOO^- M$ $O(CH_2CH_2O)_6(CH_2)_8OPhCOO^- M$ $O(CH_2CH_2O)_{10}(CH_2)_{10}OPhCOO^- M$ $O(CH_2CH_2O)_{15}(CH_2)_{15}OPhCOO^- M$ $O(CH_2CH_2O)_2(CH_2)_{20}OPhCOO^- M$ $OCH_2CH_2CH_2CH_2CH_2CH_2CH_2CH_2O(CH_2)_2OPhCOO^- M$ $OCH_2CH_2CH_2CH_2O(CH_2)_3OPhCOO^- M$ $OCH_2CH_2CH_2CH_2O(CH_2)_4OPhCOO^- M$ $OCH_2CH_2CH_2CH_2CH_2CH_2CH_2CH_2O(CH_2)_5OPhCOO^- M$ $OCH_2CH_2CH_2CH_2CH_2CH_2O(CH_2)_6OPhCOO^- M$ $OCH(CH_3)CH_2O(CH_2)_7OPhCOO^- M$ $OCH(CH_3)CH_2O(CH_2)_8OPhCOO^- M$

Specific examples of the repeating structural unit represented by the general formula (3) are shown below.

Incidentally, shown below are structures of only the side chain $-O(RO)_m(CH_2)_q COO^- M$ group bonded to the $-(CH_2-CH)-$ of the repeating structural unit represented by the general formula (3).

$OCH_2CH_2O(CH_2)_2COO^- M$ $OCH_2CH_2O(CH_2)_3COO^- M$ $OCH_2CH_2O(CH_2)_4COO^- M$ $OCH_2CH_2O(CH_2)_5COO^- M$ $OCH_2CH_2O(CH_2)_6COO^- M$ $OCH_2CH_2O(CH_2)_7COO^- M$ $OCH_2CH_2O(CH_2)_8COO^- M$ $OCH_2CH_2O(CH_2)_{10}COO^- M$ $OCH_2CH_2O(CH_2)_{15}COO^- M$ $OCH_2CH_2O(CH_2)_{20}COO^- M$ $O(CH_2CH_2O)_2(CH_2)_2COO^- M$ $O(CH_2CH_2O)_3(CH_2)_3COO^- M$ $O(CH_2CH_2O)_{10}(CH_2)_4COO^- M$ $O(CH_2CH_2O)_{20}(CH_2)_5COO^- M$ $O(CH_2CH_2O)_2(CH_2)_6COO^- M$ $O(CH_2CH_2O)_5(CH_2)_7COO^- M$ $O(CH_2CH_2O)_6(CH_2)_8COO^- M$ $O(CH_2CH_2O)_{10}(CH_2)_{10}COO^- M$ $O(CH_2CH_2O)_{15}(CH_2)_{15}COO^- M$ $O(CH_2CH_2O)_2(CH_2)_{20}COO^- M$ $OCH_2CH_2CH_2CH_2CH_2CH_2CH_2CH_2O(CH_2)_2COO^- M$ $OCH_2CH_2CH_2CH_2O(CH_2)_3COO^- M$ $OCH_2CH_2CH_2CH_2O(CH_2)_4COO^- M$ $OCH_2CH_2CH_2CH_2CH_2CH_2CH_2CH_2O(CH_2)_5COO^- M$ $OCH_2CH_2CH_2CH_2CH_2CH_2O(CH_2)_6COO^- M$ $OCH(CH_3)CH_2O(CH_2)_7COO^- M$ $OCH(CH_3)CH_2O(CH_2)_8COO^- M$ (Ph represents 1,4-phenylene or 1,3-phenylene, and Np represents 2,6-naphthylene, 1,4-naphthylene or 1,5-naphthylene.)

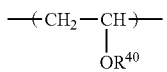

wherein $R^{40}$ represents —X—(Y)$_t$—(COOH)$_r$, —X—(Y)$_t$—(COOR$^{10}$)$_r$, or —X—(Y)$_t$—(COO—M)$_r$; where X represents a straight-chain, branched or cyclic alkylene group having 1 to 20 carbon atoms, or —(CH(R$^5$)—CH(R$^6$)—O)$_p$—(CH$_2$)$_m$—(O)$_n$ or —(CH$_2$)$_m$—(O)$_n$—(CH$_2$)$_q$— or a structure in which at least one of the methylene groups of these has been substituted with an oxygen atom, a carbonyl group or an aromatic ring structure, r represents an integer of 1 or 2, p represents an integer of 1 to 20, m represents an integer of 0 to 36, n represents an integer of 1 or 0, q represents an integer of 0 to 20, Y represents an aromatic ring structure at least one hydrogen atom of which has been substituted with a fluorine atom, t represents an integer of 0 to 10, and, where t is plural, each Y may be different, R$^{10}$ represents a substituted or unsubstituted alkyl group or aromatic ring structure, M represents a monovalent or polyvalent cation, R$^5$ and R$^6$ each represents a hydrogen atom or an alkyl group, and R$^5$ and R$^6$ may be the same or different.

Specific examples of the repeating structural unit represented by the general formula (4) are given below.

Incidentally, shown below are structures of only the side chain —OR$^{40}$ group bonded to the —(CH$_2$—CH)— of the repeating structural unit represented by the general formula (4).

OCH$_2$CH$_2$OPh(4F)COOH

OCH$_2$CH$_2$OPh(4F)COO$^-$M

OCH$_2$CH(C$_2$H$_5$)OPh(3F)COO$^-$M

O(CH$_2$CH$_2$O)$_3$Np(5F)COOH

OCH$_2$CH$_2$O(CH$_2$)$_3$Ph(3F)COO$^-$M

O(CH$_2$CH$_2$O)$_7$PhPh(3F)COO$^-$M

OCH$_2$CH$_2$OPyPh(2F)COO$^-$M

O(CH$_2$CH$_2$O)$_{20}$Ph(2F)COOH

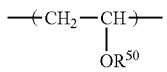

wherein R$^{50}$ represents —X—(Y)$_t$—SO$_3$H, —X—(Y)$_t$—SO$_3$R$^{10}$ or —X—(Y)$_t$—SO$_3$—M; where X represents a straight-chain, branched or cyclic alkylene group having 1 to 20 carbon atoms, or —(CH(R$^5$)—CH(R$^6$)—O)$_p$—(CH$_2$)$_m$—(O)$_n$— or —(CH$_2$)$_m$(O)$_n$—(CH$_2$)$_q$— or a structure in which at least one of the methylene groups of these has been substituted with a carbonyl group, an oxygen atom or an aromatic ring structure, p represents an integer of 1 to 20, m represents an integer of 0 to 36, n represents an integer of 1 or 0, q represents an integer of 0 to 20, Y represents a substituted or unsubstituted aromatic ring structure, t represents an integer of 0 to 10, and, where t is plural, each Y may be different, R$^{10}$ represents an alkyl group, M represents a monovalent or polyvalent cation, R$^5$ and R$^6$ each represents a hydrogen atom or an alkyl group, and R$^5$ and R$^6$ may be the same or different.

Specific examples of the repeating structural unit represented by the general formula (5) are given below.

Incidentally, shown below are structures of only the side chain —OR$^{50}$ group bonded to the —(CH$_2$—CH)— of the repeating structural unit represented by the general formula (5).

OCH$_2$CH$_2$OPhSO$_3$H

OCH$_2$CH$_2$OPhSO$_3$$^-$M

OCH$_2$CH$_2$PhSO$_3$H

OCH$_2$CH$_2$PhSO$_3$$^-$M

OCH$_2$CH$_2$OPhPhSO$_3$$^-$M

OCH$_2$CH$_2$ONpSO$_3$$^-$M

OCH$_2$CH$_2$CH$_2$OPhSO$_3$H

OCH$_2$CH$_2$Ph(CH$_3$)SO$_3$$^-$M

OCH$_2$CH$_2$CH$_2$CH$_2$PhSO$_3$$^-$M

OCH$_2$CH$_2$CH$_2$OPhSO$_3$$^-$M

OCH$_2$CH(CH$_3$)OPhSO$_3$$^-$M

OCH$_2$CH(C$_2$H$_5$)OPhSO$_3$H

OCH$_2$CH(C$_3$H$_7$)OPhSO$_3$$^-$M

O(CH$_2$CH$_2$O)$_2$PhSO$_3$H

OCH$_2$CH$_2$O(CH$_2$CH$_2$CH$_2$O)$_2$PhSO$_3$H

OCH$_2$CH$_2$PyPhSO$_3$$^-$M

OCH$_2$CH$_2$OPyPhSO$_3$$^-$M

O(CH$_2$CH$_2$O)$_2$(CH$_2$)$_2$PhSO$_3$H

O(CH$_2$CH$_2$O)$_3$(CH$_2$)$_2$PhSO$_3$$^-$M

O(CH$_2$CH$_2$O)$_{20}$PhSO$_3$H

O(CH$_2$CH$_2$O)$_2$(CH$_2$)$_6$OPhSO$_3$$^-$M

O(CH$_2$CH$_2$O)$_6$(CH$_2$)$_8$OPhSO$_3$H

O(CH$_2$CH$_2$O)$_{10}$(CH$_2$)$_{10}$OPhSO$_3$$^-$M

O(CH$_2$CH$_2$O)$_2$(CH$_2$)$_{20}$OPhSO$_3$H

OCH$_2$CH$_2$CH$_2$CH$_2$CH$_2$CH$_2$CH$_2$CH$_2$O(CH$_2$)$_2$OPhSO$_3$$^-$M

OCH$_2$CH$_2$CH$_2$CH$_2$O(CH$_2$)$_4$OPhSO$_3$H

OCH$_2$CH$_2$CH$_2$CH$_2$CH$_2$CH$_2$CH$_2$O(CH$_2$)$_5$OPhSO$_3$$^-$M (Ph represents 1,4-phenylene or 1,3-phenylene, Py represents 2,5-pyrimidyl, Pyr represents 2,5-pyridyl, and Np represents 2,6-naphthyl, 1,4-naphthyl or 1,5-naphthyl.)

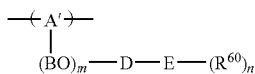

wherein A' represents a substituted or unsubstituted polyalkenyl ether group, B represents a substituted or unsubstituted straight-chain or branched alkylene group having 1 to 15 carbon atoms; m represents an integer of 0 to 30, and, when m is plural, each B may be different; D represents a single bond or a substituted or unsubstituted straight-chain or branched alkylene group having 1 to 10 carbon atoms; E represents a substituted or unsubstituted aromatic ring, a substituted or unsubstituted condensed ring or a structure in which at most three substituted or unsubstituted aromatic rings are bonded through single bonds; and $R^{60}$ represents —COOH, —COOR$^4$ or —COO$^-$M, where $R^4$ represents a hydrogen atom, a substituted or unsubstituted straight-chain or branched alkylene group having 1 to 5 carbon atoms or a substituted or unsubstituted aromatic ring, and M represents a monovalent or polyvalent metallic cation; n represents an integer of 2 or more, representing that the group represented by $R^{60}$ in the formula is substituted on the aromatic ring represented by E; and a hydrogen atom not substituted by $R^{60}$ in the aromatic ring may be substituted.

As specific examples of the repeating structural unit represented by the general formula (6), it may include the following.

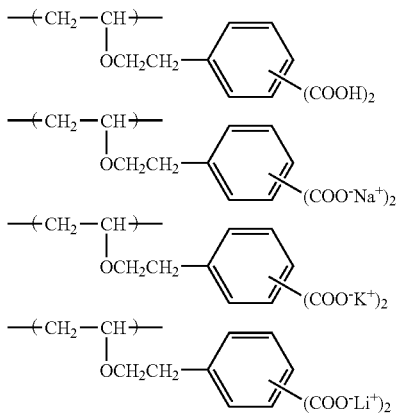

An embodiment is also described in which the amphiphilic polymer in the second liquid composition has a dioxyethylene unit structure.

The amphiphilic polymer having a dioxyethylene unit structure that may be used in the present invention may preferably have a repeating structural unit represented by the following general formula (7).

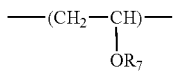

wherein $R_7$ represents a hydrogen atom, or is selected from —CH($R_8$)—CH($R_9$)—O)$_p$—$R_{10}$ and —(CH$_2$)$_m$—(O)$_n$—$R_{10}$, where p represents an integer of 1 to 18, m represents an integer of 1 to 36, n represents an integer of 0 or 1, $R_8$ and $R_9$ each represent a hydrogen atom or —CH$_3$, and $R_{10}$ represents a hydrogen atom or a straight-chain, branched or cyclic alkylene group having 1 to 5 carbon atoms.

Specific examples of the repeating structural unit of the amphiphilic polymer having a dioxyethylene unit structure represented by the general formula (7) are given below, but by no means limited to these.

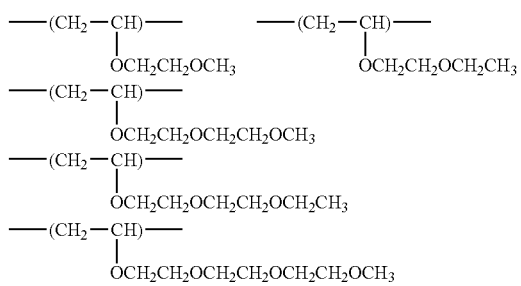

In the second liquid composition in the present invention, an anionic amphiphilic polymer having a polyvalent cation is used.

In a preferred embodiment of the present invention, the polyvalent cation in the second liquid composition is a metallic cation. Stated specifically, it may include divalent cations such as Ca, Cu, Mg, Ni, Zn, Fe and Co, and trivalent cations such as Al, Nd, Y, Fe and La. As a non-metallic cation, it may include a diammonium cation and a triammonium cation. The present invention is not limited to these specific examples.

As the anionic moiety of the anionic amphiphilic polymer used in the first liquid composition in the present invention, preferably used are the carboxylic acid structures of the above general formulas (2), (3) and (6). As the anionic moiety of the anionic amphiphilic polymer, which is the counter ion of the polyvalent cation of the second liquid composition in the present invention, preferably used are the structures of the general formulas (4) and (5).

The block polymer used in the present invention may preferably have a molecular weight distribution Mw (weight-average molecular weight)/Mn (number-average molecular weight) of 2.0 or less, which may more preferably be 1.6 or less, still more preferably 1.3 or less, and further preferably 1.2 or less.

The block polymer or graft polymer used in the present invention may have a number-average molecular weight Mn of 200 or more, which may preferably be 3,000 or more, and should be not more than 1,000,000. If it has a number-average molecular weight Mn of less than 200, the functional substance may have not good dispersion stability. The number-average molecular weight and weight-average molecular weight of the polymer in the present invention may be measured by excluded-volume chromatography (also called gel permeation chromatography, GPC).

The block polymer or graft polymer used in the liquid compositions in the present invention may be in a content of from 0.1% by weight or more to 90% by weight or less, and preferably from 1% by weight or more to 50% by weight or less. If it is in a content of less than 0.1% by weight, the functional substance may be dispersed or dissolved in the liquid compositions in an insufficient state. If it is in a content of more than 90% by weight, the liquid compositions may have too high viscosity.

The functional substance contained in the liquid compositions may preferably be kept enclosed by the block polymer or graft polymer in the sense that any changes of properties due to influence coming from external environment are to be kept from being caused. The amphiphilic block polymer or graft polymer is effective in that the functional substance can be enclosed with ease by the formation of a self-integrated structure. Also, in order for the functional substance to be improved in dispersion stability and be improved in enclosability (or includability), the block polymer or graft polymer may be more flexible in molecular motion. This is preferable because the polymer has sites where it becomes physically entangled with the particle surfaces of the functional substance to readily have an affinity therefor.

Moreover, it may preferably be flexible also in that a coat layer can be formed with ease on a recording medium as described later. For this end, the backbone chain of the block polymer may preferably have a glass transition temperature Tg of 20° C. or less, more preferably 0° C. or less, and still more preferably −20° C. or less. In this regard as well, the polymer having a polyvinyl ether structure may preferably be used because it has a low glass transition temperature and has flexible properties.

The liquid compositions in the present invention each enclose the functional substance as mentioned above. To form the state of enclosure, for example, a solution prepared by dissolving a coloring material (functional substance) in an organic solvent insoluble in water may be added to the micelle in water the block polymer or graft polymer forms and thereafter the organic solvent may be removed. Besides, the block polymer or graft polymer and a coloring material may be dissolved together or dispersed uniformly in an organic solvent and, in this state, this may be phase-inverted in an aqueous solvent so as to utilize a self-integrable process, to form the state of enclosure or inclusion. The residual solvent may be evaporated off. Further, for example, a solution prepared by dispersing a pigment in an organic solvent insoluble in water may be added to the micelle in water the block polymer or graft polymer forms, to form the state of enclosure. In view of an advantage that the self-integrated structure can more preferably be formed and a good state can be formed also from the viewpoint of recording characteristics, it is preferable that the block polymer is used in both the first liquid composition and the second liquid composition in the present invention.

The state of enclosure may be confirmed by instrumental analysis such as every kind of electron microscope analysis or X-ray diffraction. Also, in the case of the inclusion (enclosure) in the state of micelle, the coloring material separates from the solvent separately from the polymer, and this enables indirect confirmation of the state of enclosure.

As described above, the block polymer or the graft polymer may preferably form a micelle state. For this purpose as well, those which are amphiphilic are effective as the block polymer or graft polymer used in the present invention. In this sense, the block polymer or the graft polymer may more preferably have a polymer segment having an ionic repeating structural unit. It may preferably have, also in view of the necessity described later, the ionic repeating structural unit. This is preferable also for forming the state of enclosure. In the present invention, the block polymer may preferably be used from the viewpoint of the stability of dispersion, the enclosure of the functional substance, and various properties such as viscosity.

The functional substance kept enclosed by the block polymer or graft polymer may preferably be in a proportion of 90% by weight or more, more preferably 95% by weight or more, and still more preferably 98% by weight or more, based on the total weight of the functional substance contained in the liquid composition. In regard to this weight ratio, it may be observed by instrumental analysis such as every kind of electron microscope analysis or X-ray diffraction, or, in the case of the coloring material, by analysis of color development concentration, or also by the indirect method described previously.

In the present invention, an organic acid formed by protonation to the anion of the anionic amphiphilic polymer in the second liquid composition may preferably have a pKa which is smaller than the pKa of an organic acid of the first liquid composition. The former may preferably have a pKa of 4.5 or less, and more preferably 2 or less or 0 or less. Incidentally, the pKa is meant to be the acid dissociation exponent, and refers usually to the acid dissociation exponent in water. Herein, the pKa is defined in respect to the molar concentration of an acid structural unit of the polymer used. It may directly be determined by measuring the pH of an aqueous polymer solution having been so prepared that the acid structural unit is in a weight of 1 mol/L. Hydrogen ion concentration may be measured with a pH meter, on the basis of which the pKa is determined from $pKa=-\log Ka(Ka=[H^+]/[HA]$, where A represents the conjugate base of acid). Then, as the organic acid that materializes the foregoing, preferably used is a halogen-substituted benzoic acid group or a sulfonic acid group. Also, the anion of the anionic amphiphilic polymer in the first liquid composition may preferably be a carboxylate anion.

In the present invention, the amphiphilic polymer in the second liquid composition may preferably have a dioxyethylene unit structure. Polyvalent cations present in the second liquid composition coordinate with dioxyethylene units of the micelles of the amphiphilic polymer. As the result, the micelles are stably dispersed in aqueous particles, and also the liquid compositions can stably be ejected when used as inks of a liquid-applying apparatus of an ink-jet recording system or the like.

In the present invention, at least two kinds of liquid compositions as described above are used which are the first liquid composition which contains in a liquid medium the functional substance and the block polymer or graft polymer (the anionic amphiphilic polymer) and the second liquid composition which contains in a liquid medium the functional substance and the anionic amphiphilic polymer having the polyvalent cation as a counter cation. The present invention is a liquid-applying method, or an image forming method, in which the two kinds of liquid compositions, e.g., stated typically, liquid compositions each making use of a coloring material as the functional substance come into liquid/liquid contact on a recording medium, whereupon at least one liquid composition comes responsive in virtue of the other liquid composition to come to thicken so that the two kinds of liquid compositions can be kept from blotting between them, can be improved in fixing performance on recording mediums and can be improved in drying speed.

Accordingly, the two kinds of liquid compositions are different ones, which may preferably be those in which block polymers or graft polymers are different, and moreover may preferably those which come responsive upon their liquid/liquid contact with each other to make the block polymer or graft polymer undergo modification. Especially in the present invention, they are so designed that the polyvalent cation used in the second liquid composition causes mutual action with the anionic moiety of the amphiphilic polymer in the first liquid composition to come to thicken. Examples of such cases are more specifically given below.

A water-based dispersion ink is available in which the amphiphilic block polymer encloses a black pigment, where, as an anionic unit of this block polymer, one composed of potassium carboxylate is used. As a further additional ink composition, a water-based dispersion ink is available in which the amphiphilic block polymer encloses a yellow pigment, where, as a hydrophilic unit of this block polymer, one composed of magnesium sulfonate or a magnesium salt of fluoro-substituted benzoic acid. The former and the latter are applied by ink-jet recording at adjoining areas to come into liquid/liquid contact, whereupon the former's carboxylate anion and divalent magnesium cation strongly act on each other, so that such pigment-enclosed dispersions more strongly act on each other to come to thicken. In an extreme case, particles come to agglomerate. In any case, they come to thicken as inks, so that bleeding, i.e., color migration (or mixing) may less occur and meanwhile the drying time is shortened. The mechanism by which the drying time is shortened as a result of thickening is unclear, and it is considered due to the fact that both the amphiphilic polymers strongly act on each other between them and the recording medium by the theory of molecular motion in the course of the thickening on the recording medium. In this regard, it is preferable to use a dispersion in which both the amphiphilic polymers, in particular, block polymers enclose the colorants. It is also preferable to use a tri-block polymer.

In addition, the counter cation of the anionic amphiphilic polymer in the second liquid composition in the present invention is the polyvalent cation, where the hydrogen ion concentration of that composition can be made lower in virtue of the fact that the counter cation is the polyvalent cation. Especially in liquid-applying apparatuses, ink-jet recording apparatuses and so forth, many of them have no sufficient resistance to hydrogen ion concentration, and cases are often seen in which the apparatuses themselves do not hold because of extremely acidic compositions. In that sense, the liquid compositions in the present invention as described above can be used keeping the hydrogen ion concentration neutral or in a closely neutral state, or weakly alkaline. This is greatly characteristic of the present invention. The hydrogen ion concentration in each liquid composition may preferably be 3 or more in pH, and more preferably 5 or more. In some cases, it may also be 7 or more.

As the counter cation of the anionic amphiphilic polymer in the first liquid composition, preferably usable are sodium, potassium, cesium and so forth.

In the present invention, as described above, making the first liquid composition and the second liquid composition come into contact with each other causes at least one of these liquid compositions to thicken. What is meant by "the first liquid composition and the second liquid composition come into contact with each other" means that the liquid surface of the first liquid composition and the liquid surface of the second liquid composition come into contact with each other, and differs from putting liquids of two liquid compositions into a container at one time to mix them mechanically. For example, the liquid surfaces of two liquid compositions having been simultaneously ejected by ink-jet recording apparatus come into contact with each other, where carboxylate anions and divalent magnesium cations both having mutually moved inwards from the interfaces of contact strongly act on each other, and the pigment-enclosed dispersions more strongly act on each other, thus the liquid compositions come to thicken.

In the present invention, liquid compositions are used in each of which the functional substance has favorably been dispersed. In particular, dispersed ink compositions making use of coloring materials are typical. As the coloring materials to be dispersed, in the case of pigments or dyes, they are used not in a dissolved state but in a dispersed state. In such coloring material dispersed ink compositions, compared with typical examples in which coloring materials conventionally used are used in a dissolved state, e.g., water-based dye ink compositions making use of water-soluble dyes, the action of thickening or agglomeration is effective in the present invention, so that the color blurring can greatly be remedied and also the effect of shortening the drying time, or short-time fixing performance, can greatly be improved. Where the image or pattern forming method of the present invention is carried out using two kinds of ink liquid compositions, it is particularly preferable to use such coloring material dispersed ink compositions for the both. Also, in such a case, it is more preferable that the coloring materials are enclosed by the amphiphilic block polymers.

As the liquid compositions used in the course of image formation, liquid compositions in which the block polymer forms a micelle state may preferably be used in view of an advantage such that they thicken so greatly that color migration can greatly be restrained and the time taken for drying up can be shortened. They may likewise preferably be used also when they form the state in which the coloring material such as a pigment is enclosed by the block polymer.

In order to make up the liquid compositions that form the state in which the functional substance, in particular, the coloring material is enclosed by the block polymer, the block polymer may preferably have a weight-average molecular weight of 10,000 or more, and more preferably 15,000 or more, which may be 30,000 or more in some cases as being very preferable. Also, the block polymer used in view of an advantage such that the liquid compositions thicken so greatly that color migration can greatly be restrained and the time taken for drying up can be shortened may likewise preferably have a weight-average molecular weight of 10,000 or more, and more preferably 15,000 or more, which may be 30,000 or more in some cases as being very preferable. In particular, the hydrophobic block segment of the block polymer may have a number-average molecular weight of 5,000 or more, and more preferably 10,000 or more.

As a preferred embodiment in the present invention, the unit having the carboxylate anion of the amphiphilic block polymer used favorably in the first liquid composition may preferably have a degree of polymerization of 50 or less, which may be 30 or less or 20 or less in some cases. Here, forming the coloring material enclosed state is preferable in order to enable image formation more effectively. For this end, the repeating structural unit other than that may preferably have a degree of polymerization of 50 or more, and more preferably 100 or more.

The liquid compositions in the present invention may also be incorporated with various kinds of modifiers or additives other than the foregoing, as exemplified by an antioxidant, a viscosity modifier, an ultraviolet absorber, a surface-active agent and a mildewproofing agent. Meanwhile, the thickening action that is operation and effect brought by the present invention is owing to the amphiphilic block polymer or graft polymer that is the constituent factor of the present invention, and such a polymer alone is sufficiently effective. Accordingly, it is unnecessary to add other additive(s) afresh which has or have thickening action, but of course the present invention by no means excludes the addition of such an additive(s) in the sense of auxiliary use.

An ink-jet recording apparatus is described next which utilizes the liquid compositions according to the present invention as inks (making use of a coloring material as the functional substance). As the ink-jet recording apparatus, it is applicable to various ink-jet recording apparatus of a piezo-electric ink-jet recording system making use of piezoelectric elements, a thermal ink-jet recording system which causes heat energy to act on inks to effect bubbling to perform recording, and so forth.

This ink-jet recording apparatus is schematically described below with reference to FIG. 1. Incidentally, FIG. 1 shows an example of construction to the end, which by no means limits the present invention.

FIG. 1 is a block diagram showing the construction of an ink-jet recording apparatus.

FIG. 1 shows a case in which a head is made to move to perform recording on a recording medium. As shown in FIG. 1, to a CPU (central processing unit) 50 which controls the whole motion of the recording apparatus, an X-direction driving motor 56 and a Y-direction driving motor 58 which are to drive the head in the XY directions are connected via an X-motor driving circuit 52 and a Y-motor driving circuit 54, respectively. According to instructions from the CPU 50, the X-direction driving motor 56 and the Y-direction driving motor 58 are driven through the X-motor driving circuit 52 and the Y-motor driving circuit 54, respectively, and the head 70 is then positioned in respect to the recording medium.

As shown in FIG. 1, to the head 70, a head driving circuit 60 is connected in addition to the X-direction driving motor 56 and the Y-direction driving motor 58. The CPU 50 controls the head driving circuit 60 to drive the head 70, i.e., to eject an ink-jet recording ink. To the CPU 50, an X-encoder 62 and a Y-encoder 64 are further connected which are to detect the positions of the head, and the positional information of the head 70 is inputted thereto. A control program is also inputted to a program memory 66. The CPU 50 makes the head 70 move on the bases of this control program and the positional information sent from the X-encoder 62 and Y-encoder 64, and makes the head disposed at the desired position on the recording medium and eject the ink-jet recording ink. In this way, the desired images can be formed on the recording medium. Also, in the case of an image recording apparatus in which a plurality of ink-jet recording inks can be loaded, the operation as described above may be repeated given times in respect to the ink-jet recording inks, whereby the desired images can be formed on the recording medium.

After the ejection of the ink-jet recording ink, the head 70 may also optionally be moved to a position where a removing means (not shown) for removing excess ink having adhered to the head is disposed, to clean the head 70 by wiping or the like. As a specific method for such cleaning, a conventional method may be used as it is.

After images have been formed, the recording medium on which the images have been formed is replaced by a new recording medium by way of a recording medium transporting mechanism not shown.

Incidentally, in the present invention, the above embodiment may be modified or transformed as long as such modification or the like does not deviate from the gist of the present invention. For example, in the foregoing description, an example is shown in which the head 70 is moved in the directions of X-Y axes. This head 70 may instead be so made as to move only the X-axis direction (or the Y-axis direction) and the recording medium may be moved in the Y-axis direction (or the X-axis direction), to form images while moving these interlockingly.

The present invention brings a superior effect on a head having a means for generating heat energy as the energy utilized in order to eject ink-jet recording ink (e.g., an electricity-heat converter or a laser), and ejecting ink-jet recording ink by the action of the heat energy. Such a system enables achievement of highly minute image formation. The use of the liquid compositions in the present invention as inks enables much superior image formation.

As to typical construction and principles of the apparatus having such a means for generating heat energy, preferred are those which perform recording by using fundamental principles as disclosed in, e.g., U.S. Pat. No. 4,723,129 and No. 4,740,796. This system is applicable to any of what are called an on-demand type and a continuous type. In particular, in the case of the on-demand type, this system is effective because at least one driving signal which corresponds to ejection information and imparts rapid temperature rise that exceeds nucleate boiling may be applied to an electricity-heat converter in which a liquid is held and which is disposed correspondingly to a flow path, to generate heat energy in the electricity-heat converter to cause film boiling to take place on the heat-acting face of the head to consequently form in-liquid bubbles one to one corresponding to this driving signal. In virtue of the growth and contraction of such bubbles, the liquid is ejected through an opening for ejection to form at least one droplet. This driving signal may be pulse-shaped, as being more preferable because the bubbles are instantly appropriately grown and contracted and hence the ejection of liquid that has especially good response can be achieved. As this pulse-shaped driving signal, those like what are disclosed in U.S. Pat. No. 4,463,359 and No. 4,345,262 are suited. Incidentally, employment of conditions disclosed in U.S. Pat. No. 4,313,124 on invention concerned with the rate of temperature rise of the above heat-acting face enables performance of more superior ejection.

As the construction of the head, also included in the present invention is, besides the construction as disclosed in the above U.S. patents, in which ejection orifices, a liquid flow path and an electricity-heat converter are combined (a linear liquid flow path or a perpendicular liquid flow path), the construction making reference to U.S. Pat. No. 4,558,333 and No. 4,459,600, which disclose construction in which a heat-acting portion is disposed in a bent region. In addition, the present invention is effective also in employing the construction based on Japanese Patent Application Laid-open No. S59-123670, which discloses construction in which a slit common to a plurality of electricity-heat converters is provided as an ejection port of the electricity-heat converters, and Japanese Patent Application Laid-open No. S59-138461, which discloses construction in which an opening through which the pressure wave of heat energy is absorbed is made to correspond to an ejection port. More specifically, whatever form the head has, the ink-jet recording ink can be ejected surely and in a good efficiency according to the present invention.

The present invention may effectively be further applied to a full-line type head having a length corresponding to the maximum width of a recording medium in the image forming apparatus of the present invention. Such a head may have either of construction which satisfies such length by combination of a plurality of heads and construction made as one head formed integrally.

In addition, the present invention is effective also when, even in a serial type one, a head fixed to the apparatus main body is used, or a replaceable chip type head is used which is fitted to the apparatus main body to enable electrical connection with the apparatus main body or feed of ink from the apparatus main body.

The apparatus of the present invention may further have a droplet removing means. Where it is provided with such a means, a much superior ejection effect can be materialized.

As the construction of the apparatus of the present invention, a preliminary auxiliary means and so forth may also additionally be provided. This is preferable because the effect brought by the present invention can be made more stable. To give examples specifically, such means may include a capping means for the head, a pressure or suction means, a heating element different from the electricity-heat converter, or a preliminary heating means which effects heating using combination of these, and a preliminary ejection means for performing ejection which is different from the ejection of ink.

What is most effective for the present invention is that which carries out the film bubbling system described above.

In the apparatus of the present invention, the ink ejected from each ejection orifice of the head which ejects the ink-jet recording ink may preferably be in an amount ranging from 0.1 picoliter to 100 picoliters.

The inks as the liquid compositions in the present invention may also be used in an indirect recording apparatus making use of a recording system in which the inks are applied to an intermediate transfer material and thereafter transferred to a recording medium such as paper. It may still also be applied to an apparatus making use of an intermediate transfer material handled by a direct recording system.

EXAMPLES

The present invention is described below in greater detail by giving Examples. The present invention is by no means limited to these Examples.

Synthesis Examples and Block Polymers Used (1) AB block polymer composed of isobutyl vinyl ether (IBVE: A-block component) and sodium 4-(2-vinyloxyethoxy)benzoate (B-block component); pKa of acid of this polymer is 4.27:

The inside atmosphere of a glass container fitted with a three-way cock was displaced with nitrogen, and thereafter heated to 250° C. in the atmosphere of nitrogen gas to remove adsorbed water. After the system was returned to room temperature, 20 mmols (millimols) of isobutyl vinyl ether (IBVE), 16 mmols of ethyl acetate, 0.1 mmol of 1-isobutoxyethyl acetate and 11 ml of toluene were added, and the reaction system was cooled. At the time the temperature in the system reached 0° C., 0.2 mmol of ethylaluminum sesquichloride (an equimolar mixture of diethylaluminum chloride and ethylaluminum dichloride) was added to initiate polymerization. Molecular weight was time-sharingly monitored using molecular sieve column chromatography (GPC), where the polymerization for the A-block was confirmed to have been completed.

Next, a toluene solution of 10 mmols of the B-block component was added to continue polymerization. After 16 hours, the polymerization reaction was stopped. To stop the polymerization reaction, an aqueous 0.3% by weight ammonia/methanol solution was added to the system. The reaction mixture solution obtained was diluted with dichloromethane, followed by washing with 0.6 M hydrochloric acid three times and subsequently with distilled water three times. The organic layer obtained was concentrated and evaporated to dryness by means of an evaporator, and this was vacuum-dried. The vacuum-dried product was repeatedly dialyzed in a methanol solvent by the use of a cellulose semipermeable membrane to remove a monomeric compound, thus a di-block polymer was obtained.

This polymer had a polymerization ratio of A/B=200/30, a number-average molecular weight of 35,000 and a weight-average molecular weight of 43,200. The compound was identified by NMR and GPC. Then, 26 parts by weight of this block polymer was stirred at 0° C. for 3 days together with 200 parts by weight of an aqueous sodium hydroxide solution with pH 13 to make up a sodium carboxylate polymer solution. Dialysis was carried out to remove excess sodium hydroxide, followed by drying, and then the solvent was evaporated off to isolate a sodium carboxylate type AB block polymer.

(2) An AB block polymer composed of isobutyl vinyl ether (IBVE: A-block component) and sodium salt of 6-(2-vinyloxyethoxy)hexanoic acid (B-block component) was synthesized in the same manner as the above (1). Polymerization ratio: A/B=200/28; number-average molecular weight: 36,000; and weight-average molecular weight: 45,000 (all before hydrolysis). The pKa of acid of this polymer was 4.92.

(3) A di-block polymer composed of isobutyl vinyl ether and 2-vinyloxy-1-biphenyloxyethyl (A-block components) and sodium 5-(2-vinyloxyethoxy)benzene-1,3-dicarboxlate (B-block component) was synthesized in the same manner as the above (1). Polymerization ratio: A/B=100/15; number-average molecular weight: 15,000; and weight-average molecular weight: 18,200 (all before hydrolysis). The pKa of acid of this polymer was 4.19.

(4) A di-block polymer composed of isobutyl vinyl ether and 2-vinyloxy-1-biphenyloxyethyl (A-block components) and magnesium 4-(2-vinyloxyethoxy)-2,3,5,6-tetrafluorobenzoate (B-block component) was synthesized in the same manner as the above (1). Polymerization ratio: A/B=100/17; number-average molecular weight: 16,000; and weight-average molecular weight: 19,900 (all before hydrolysis). The pKa of acid of this polymer was 1.97.

(5) A di-block polymer composed of isobutyl vinyl ether and 2-vinyloxy-1-biphenyloxyethyl (A-block components) and magnesium 4-(2-vinyloxyethoxy)benzenesulfonate (B-block component) was synthesized in the same manner as the above (1). Polymerization ratio: A/B=100/15; number-average molecular weight: 14,800; and weight-average molecular weight: 18,500 (all before hydrolysis). The pKa of acid of this polymer was −0.81.

(6) A tri-block polymer composed of isobutyl vinyl ether and 2-vinyloxy-1-biphenyloxyethyl (A-block components), 2-methoxyethyl vinyl ether (B-block component) and sodium 4-(2-vinyloxyethoxy)benzoate (C-block component) was synthesized in the same manner as the above (1). Polymerization ratio: A/B/C=100/116/9; number-average molecular weight: 25,300; and weight-average molecular weight: 30,800 (all before hydrolysis). The pKa of acid of this polymer was 4.34.

(7) Block polymer (7) was synthesized in the same manner as the above (1) except that, in place of the A-componet IBVE of the block polymer (1) in Synthesis Examples, 2-ethoxyethyl vinyl ether was used. The pKa of acid of this polymer was 4.94. Glass transition temperature Tg of this polymer was measured with a DSC (differential scanning calorimeter) (DSC-7, manufactured by Perkin-Elmer Corporation) to find that it was −21° C.

(8) An AB block polymer composed of 2-(4-methylbenzeneoxy)ethyl vinyl ether (TolOVE: A-block component) and sodium 4-(2-vinyloxyethoxy)benzoate (B-block component) was synthesized in the same manner as the above (1). Polymerization ratio: A/B=100/15; number-average molecular weight: 17,000; and weight-average molecular weight: 19,000 (all before hydrolysis). The pKa of acid of this polymer was 4.30.

(9) A tri-block polymer composed of isobutyl vinyl ether and 2-vinyloxy-1-biphenyloxyethyl (A-block components), 2-methoxyethyl vinyl ether (B-block component) and sodium 4-(2-vinyloxyethoxy)benzenesulfonate (C-block component) was synthesized in the same manner as the above (1). Polymerization ratio: A/B/C=100/80/15; number-average molecular weight: 26,000; and weight-average molecular weight: 33,000 (all before hydrolysis). The pKa of acid of this polymer was −0.81.

(10) A tri-block polymer composed of isobutyl vinyl ether and 2-vinyloxy-1-biphenyloxyethyl (A-block components), diethylene glycol methyl vinyl ether (B-block component) and sodium 4-(2-vinyloxyethoxy)benzenesulfonate (C-block component) was synthesized in the same manner as the above (1). Polymerization ratio: A/B/C=100/80/15; number-average molecular weight: 29,500; and weight-average molecular weight: 37,400 (all before hydrolysis). The pKa of acid of this polymer was −0.81.

Example 1

3 parts by weight of a magenta pigment (C.I. Pigment Red 122), 5 parts by weight of the block polymer (1) and 15 parts by weight of diethylene glycol were added to 178 parts by weight of ion-exchanged water, followed by dispersion using an ultrasonic homogenizer. The dispersion obtained was filtered under pressure through a filter of 1 µm in pore size to prepare a pigment dispersed water-based ink. The pigment showed good dispersibility.

3 parts by weight of a black pigment (trade name: MOGUL-L, available from Cabot Corp.), 5 parts by weight of the block polymer (5) and 15 parts by weight of diethylene glycol were added to 178 parts by weight of ion-exchanged water, followed by dispersion using an ultrasonic homogenizer. The dispersion obtained was filtered under pressure through a filter of 1 µm in pore size to prepare a pigment dispersed water-based ink, and its pH was adjusted to 6.2. The pigment showed good dispersibility.

Using the two kinds of inks thus prepared, ink-jet recording was performed. Ink tanks of an ink-jet printer BUBBLE JET (registered trademark) (trade name: BJF800, manufactured by CANON INC.) were respectively filled with the two kinds of ink compositions, and a pattern formed alternately of black and magenta colors at intervals of 1 mm was recorded on plain paper. As the result, the black and magenta colors were seen to have little blurred at their boundaries. As a result of observation with a microscope, blurs were found to be 0.10 mm in width on the average.

0.3 ml each of the two kinds of inks were also mixed in a vial. As the result, they thickened obviously. Viscosities which were 4.8 cPs for the former ink and 4.9 cPs for the latter ink were found to be 31.4 cPs after mixing (the viscosity was measured with DAR 100, manufactured by Rheologica K.K.).

Comparative Example 1

3 parts by weight of a black pigment (trade name: MOGUL-L, available from Cabot Corp.), 3 parts by weight of sodium styrene acrylate (molecular weight: 6,300; polymerization ratio: 1:1) and 15 parts by weight of diethylene glycol were added to 178 parts by weight of ion-exchanged water, followed by dispersion using an ultrasonic homogenizer. Thereafter, the dispersion obtained was filtered under pressure through a filter of 1 µm in pore size to prepare a black pigment dispersed water-based ink. Using this ink and a magenta ink furnished in an ink jet printer (trade name: BJF800, manufactured by CANON INC.), a printing test was conducted in the same manner as in Example 1. As the result, the black and magenta colors were seen to have clearly blurred at their boundaries. As a result of observation with a microscope, blurs were found to be 0.24 mm in width on the average.

Example 2

26 parts by weight of the block polymer (2) and 10 parts by weight of a fat-soluble dye OIL BLUE N (trade name; available from Aldrich Chemical Co., Inc.) were co-dissolved in 85 parts by weight of dimethylformamide, and the solution obtained was converted into an aqueous phase by using 400 parts by weight of distilled water to obtain an ink. Similarly, using the block polymer (5) and a yellow fat-soluble dye (VALIFAST YELLOW 3108, available from Orient Chemical Industries, Ltd.), a yellow ink with pH 5.9 was prepared in the same way. A pattern formed alternately of both colors at intervals of 1 mm was recorded on plain paper in the same manner as in Example 1. As the result, both the colors were seen to have little blurred at their boundaries. As a result of observation with a microscope, blurs were found to be 0.11 mm in width on the average.

Immediately after the printing, a recorded pattern was also wetted with 10 ml of distilled water over an area of about 50 $cm^2$, but the colors did not come to blur at all.

Example 3

26 parts by weight of the block polymer (7) and 10 parts by weight of a fat-soluble dye OIL BLUE N (trade name; available from Aldrich Chemical Co., Inc.) were co-dissolved in dimethylformamide, and the solution obtained was converted into an aqueous phase by using 400 parts by weight of distilled water to obtain a blue ink. Similarly, using the block polymer (4) and a yellow fat-soluble dye (VALIFAST YELLOW 3108, available from Orient Chemical Industries, Ltd.), a yellow ink with pH 4.1 was prepared in the same way. A pattern formed alternately of both colors at intervals of 1 mm was recorded on plain paper in the same manner as in Example 1. As the result, both the colors were seen to have little blurred at their boundaries. As a result of observation with a microscope, blurs were found to be 0.12 mm in width on the average.

Immediately after the printing, a recorded pattern was also wetted with 10 ml of distilled water over an area of about 50 $cm^2$, but they did not come to blur at all.

The component-A 2-ethoxyethyl vinyl ether polymer of the block polymer (7) changes from hydrophobic to hydrophilic at 20° C. or less. That is, it comes to be amphiphilic when it stands at 20° C. or more to form micelles, but the micelles collapse when the ink comes to stand at 20° C. or less. This ink composition was cooled to 0° C. to make the micelle collapse. As the result, the coloring material dissolved out and came to float to the upper part of the ink, where the aqueous phase became decolored completely. From this fact, it was seen that the coloring material stood enclosed completely in block polymer micelles. This ink composition and the decolored aqueous phase were in such a concentration ratio according to intensity ratio at λmax, that the latter was 0.5% or less of the former. It was seen that 99% or more of the coloring material stood enclosed.

Example 4

15 parts by weight of the block polymer (3) and 7 parts by weight of a black pigment (trade name: MOGUL-L, available from Cabot Corp.) were mixed in 150 parts by weight of dimethylformamide, and the solution obtained was converted into an aqueous phase by using 500 parts by weight of distilled water to obtain a black ink composition.

15 parts by weight of the block polymer (4) and 7 parts by weight of C.I. Pigment Blue 15:3 were co-dissolved in a mixture of 250 parts by weight of THF (tetrahydrofuran) and 80 parts by weight of ethylene glycol. The solution obtained was converted into an aqueous phase by using 500 parts by weight of distilled water, and the THF was evaporated off under reduced pressure to obtain a blue ink composition with pH 7.5.

A pattern formed alternately of both colors at intervals of 1 mm was recorded on plain paper in the same manner as in Example 1. As the result, both the colors were seen to have little blurred at their boundaries. As a result of observation with a microscope, blurs were found to be 0.12 mm in width on the average.

Immediately after the printing, a recorded pattern was also wetted with 10 ml of distilled water over an area of about 50 cm$^2$, but they did not come to blur at all.

The above liquid compositions were each set on TEM grids (a cryotransfer system manufactured by FEI Company) to freeze the aqueous solution to make electron microscopic observation. As the result, only spherical micelle particles were observed, and it was seen that the coloring material stood enclosed completely in the block polymer.

Example 5

15 parts by weight of the block polymer (3) and 7 parts by weight of a yellow fat-soluble dye (VALIFAST YELLOW 3108, available from Orient Chemical Industries, Ltd.) were mixed in 150 parts by weight of dimethylformamide, and the solution obtained was converted into an aqueous phase by using 500 parts by weight of distilled water to obtain a yellow ink composition.

15 parts by weight of the block polymer (5) and 7 parts by weight of C.I. Pigment Blue 15:3 were co-dissolved in a mixture of 250 parts by weight of THF (tetrahydrofuran) and 80 parts by weight of ethylene glycol. The solution obtained was converted into an aqueous phase by using 500 parts by weight of distilled water, and the THF was evaporated off under reduced pressure to obtain a blue ink composition with pH 4.1.

A pattern formed alternately of both colors at intervals of 1 mm was recorded on plain paper in the same manner as in Example 1. As the result, both the blue and yellow colors were seen to have little blurred at their boundaries. As a result of observation with a microscope, blurs were found to be 0.11 mm in width on the average.

Immediately after the printing, a recorded pattern was also wetted with 10 ml of distilled water over an area of about 50 cm$^2$, but they did not come to blur at all.

The above liquid compositions were each set on TEM grids (a cryotransfer system manufactured by FEI Company) to freeze the aqueous solution to make electron microscopic observation. As the result, only spherical micelle particles were observed, and it was seen that the coloring material stood enclosed completely in the block polymer.

Comparative Example 2

A dye ink composition was obtained from 1.5 parts by weight of sodium azulenesulfonate, a blue water-soluble dye, 10 parts by weight of ethylene glycol, 10 parts by weight of diethylene glycol and 78.5 parts by weight of distilled water, and its pH was adjusted to 5.1.

26 parts by weight of the block polymer (6) and a yellow fat-soluble dye (VALIFAST YELLOW 3108, available from Orient Chemical Industries, Ltd.) were co-dissolved in 80 parts by weight of dimethylformamide, and the solution obtained was converted into an aqueous phase by using 400 parts by weight of distilled water to obtain a yellow ink.

A pattern formed alternately of both colors at intervals of 1 mm was recorded on plain paper in the same manner as in Example 1. As the result, both the colors were visually seen to have blurred at their boundaries. As a result of observation with a microscope, blurs were found to be 0.21 mm in width on the average.

Immediately after the printing, a recorded pattern was also wetted with 10 ml of distilled water over an area of about 50 cm$^2$. As the result, the colors heavily came to blur and migrate or mix at the same time, so that the recorded pattern changed greatly.

Comparative Example 3

3 parts by weight of a magenta pigment (C.I. Pigment Red 122), 5 parts by weight of a sodium styrene acrylate block polymer (1:1 copolymer; number-average molecular weight: 6,300; weight-average molecular weight: 9,200) and 15 parts by weight of diethylene glycol were added to 178 parts by weight of ion-exchanged water, followed by dispersion using an ultrasonic homogenizer. The dispersion obtained was filtered under pressure through a filter of 1 μm in pore size to prepare a pigment dispersed water-based ink. The pigment showed good dispersibility.

3 parts by weight of a black pigment (trade name: MOGUL-L, available from Cabot Corp.), 5 parts by weight of a random copolymer of sodium styrene carboxylate and styrene (1:2 copolymer; number-average molecular weight: 4,500; weight-average molecular weight: 7,900) and 15 parts by weight of diethylene glycol were added to 178 parts by weight of ion-exchanged water, followed by dispersion using an ultrasonic homogenizer. The dispersion obtained was filtered under pressure through a filter of 1 μm in pore size to prepare a pigment dispersed water-based ink. The pigment showed good dispersibility.

A pattern formed alternately of both colors at intervals of 1 mm was recorded on plain paper in the same manner as in Example 1. As the result, both the colors were visually seen to have blurred at their boundaries. As a result of observation with a microscope, blurs were found to be 0.21 mm in width on the average.

Immediately after the printing, a recorded pattern was also wetted with 10 ml of distilled water over an area of about 50 cm$^2$. As the result, the colors heavily came to blur and migrate or mix at the same time, so that the recorded pattern changed greatly.

Example 6

7 parts by weight of a sodium styrene acrylate block polymer (1:1 copolymer; number-average molecular weight: 6,300; weight-average molecular weight: 9,200), 7 parts by weight of a black pigment (trade name: MOGUL-L, available from Cabot Corp.), 40 parts by weight of ethylene glycol and 200 parts by weight of distilled water were subjected to dispersion using an ultrasonic homogenizer. The dispersion obtained was filtered under pressure through a filter of 1 μm in pore size, and its pH was adjusted to 9.3 to obtain a pigment dispersed water-based ink.

A dye ink composition with pH 4.8 was obtained from 1.5 parts by weight of sodium azulenesulfonate, a blue water-soluble dye, 10 parts by weight of ethylene glycol, 10 parts by weight of diethylene glycol, 3 parts by weight of the block polymer (5) and 77.5 parts by weight of distilled water.

A pattern formed alternately of both colors at intervals of 1 mm was recorded on plain paper in the same manner as in Example 1. As the result, both the colors were seen to have blurred at their boundaries. As a result of observation with a microscope, blurs were found to be 0.20 mm in width on the average.

Immediately after the printing, a recorded pattern was also wetted with 10 ml of distilled water over an area of about 50 cm². As the result, the colors only slightly came to blur and migrate.

The above pigment dispersed ink composition was set on TEM grids (a cryotransfer system manufactured by FEI Company) to freeze the aqueous solution to make electron microscopic observation. As the result, particles having the pigment bare held 60 percent of the whole.

Example 7

15 parts by weight of the block polymer (3) and 7 parts by weight of a black pigment (trade name: MOGUL-L, available from Cabot Corp.) were mixed in 150 parts by weight of dimethylformamide, followed by addition of 500 parts by weight of distilled water and KOH in an amount of 1 equivalent weight based on carboxylic acid moieties of the block polymer to obtain a black ink composition.

A dye ink composition with pH 5.1 was obtained from 1.5 parts by weight of sodium azulenesulfonate, a blue water-soluble dye, 10 parts by weight of ethylene glycol, 10 parts by weight of diethylene glycol, 3 parts by weight of the block polymer (4) and 77.5 parts by weight of distilled water.

A pattern formed alternately of both colors at intervals of 1 mm was recorded on plain paper in the same manner as in Example 1. As the result, both the colors were seen to have blurred at their boundaries. As a result of observation with a microscope, blurs were found to be 0.12 mm in width on the average.

Immediately after the printing, a recorded pattern was also wetted with 10 ml of distilled water over an area of about 50 cm². As the result, the colors were not seen to come to blur or migrate.

The above pigment dispersed ink composition was set on TEM grids (a cryotransfer system manufactured by FEI Company) to freeze the aqueous solution to make electron microscopic observation. As the result, only spherical particles were observed, and it was seen that the coloring material stood enclosed completely in the block polymer.

Example 8

3 parts by weight of a magenta pigment (C.I. Pigment Red 122), 5 parts by weight of the block polymer (8) and 15 parts by weight of diethylene glycol were added to 178 parts by weight of ion-exchanged water, followed by dispersion using an ultrasonic homogenizer. The dispersion obtained was filtered under pressure through a filter of 1 μm in pore size to prepare a pigment dispersed water-based ink. The pigment showed good dispersibility.

3 parts by weight of a black pigment (trade name: MOGUL-L, available from Cabot Corp.), 5 parts by weight of the block polymer (9), 15 parts by weight of diethylene glycol and 5 parts by weight of magnesium nitrate were added to 173 parts by weight of ion-exchanged water, followed by dispersion using an ultrasonic homogenizer. The dispersion obtained was filtered under pressure through a filter of 1 μm in pore size to prepare a pigment dispersed water-based ink, and its pH was adjusted to 6.2. The pigment showed good dispersibility.

Using the two kinds of inks thus prepared, ink-jet recording was performed. Ink tanks of an ink-jet printer BUBBLE JET (registered trademark) (trade name: BJF800, manufactured by CANON INC.) were respectively filled with the two kinds of ink compositions, and a pattern formed alternately of black and magenta colors at intervals of 1 mm was recorded on plain paper. As the result, the black and magenta colors were seen to have little blurred at their boundaries. As a result of observation with a microscope, blurs were found to be 0.10 mm in width on the average.

0.3 ml each of the two kinds of inks were also mixed in a vial. As the result, they thickened obviously. Viscosities which were 4.2 cPs for the former ink and 5.0 cPs for the latter ink were found to be 32.0 cPs after mixing (the viscosity was measured with DAR 100, manufactured by Rheologica K.K.).

Example 9

3 parts by weight of a magenta pigment (C.I. Pigment Red 122), 5 parts by weight of the block polymer (8) and 15 parts by weight of diethylene glycol were added to 178 parts by weight of ion-exchanged water, followed by dispersion using an ultrasonic homogenizer. The dispersion obtained was filtered under pressure through a filter of 1 μm in pore size to prepare a pigment dispersed water-based ink. The pigment showed good dispersibility.

3 parts by weight of a black pigment (trade name: MOGUL-L, available from Cabot Corp.), 5 parts by weight of the block polymer (10), 15 parts by weight of diethylene glycol and 5 parts by weight of magnesium nitrate were added to 173 parts by weight of ion-exchanged water, followed by dispersion using an ultrasonic homogenizer. The dispersion obtained was filtered under pressure through a filter of 1 μm in pore size to prepare a pigment dispersed water-based ink, and its pH was adjusted to 6.2. The pigment showed good dispersibility.

Using the two kinds of inks thus prepared, ink-jet recording was performed. Ink tanks of an ink-jet printer BUBBLE JET (registered trademark) (trade name: BJF800, manufactured by CANON INC.) were respectively filled with the two kinds of ink compositions, and a pattern formed alternately of black and magenta colors at intervals of 1 mm was recorded on plain paper. As the result, the black and magenta colors were seen to have little blurred at their boundaries. As a result of observation with a microscope, blurs were found to be 0.10 mm in width on the average.

0.3 ml each of the two kinds of inks were also mixed in a vial. As the result, they thickened obviously. Viscosities which were 4.2 cPs for the former ink and 5.2 cPs for the latter ink were found to be 32.4 cPs after mixing (the viscosity was measured with DAR 100, manufactured by Rheologica K.K.).

Example 10

The second ink compositions obtained in Example 3, Example 5, Example 8 and Example 9 making use of the block polymer (4), block polymer (5), block polymer (9) and block polymer (10), respectively, were each filled in a printing head of the ink-jet printer (trade name: BJF800, manufactured by CANON INC.), and a square image of 50 mm×50 mm was solid-printed continuously for 3 minutes. Thereafter, the head was left for 10 minutes in the state it was not covered with a cap or the like, and then the square image of 50 mm×50 mm was again solid-printed, where the proportion of blurs, chips or the like in the recorded images was evaluated according to the following criteria.

AA: Neither blur nor chip is seen at all.
A: Blurs or chips are in a proportion of less than 5% in respect to the whole recorded square image of 50 mm×50 mm.
B: Blurs or chips are in a proportion of from 5% or more to less than 30% in respect to the whole recorded square image of 50 mm×50 mm.
C: Blurs or chips are in a proportion of from 30% or more to 100% or less in respect to the whole recorded square image of 50 mm×50 mm.

On the second ink compositions obtained in Example 3, Example 5, Example 8 and Example 9 making use of the block polymer (4), block polymer (5), block polymer (9) and block polymer (10), respectively, evaluation was made, where evaluation results were A, A, AA and AA in order.

INDUSTRIAL APPLICABILITY

The present invention concerns a recording method which makes use of two or more kinds of liquid compositions different in properties, containing functional substances such as coloring materials, and brings these liquid compositions into contact with one another to cause the liquid compositions to thicken, to thereby enable good image formation or pattern formation. This method enables the functional substances such as coloring materials to be kept from being unfavorably mixed on recording mediums. This enables achievement of good fixing performance of coloring materials or the like on recorded areas, and enables formation of good patterns. Thus, this method is utilizable in the technical field of digital printing, such as ink-jet recording.

This application claims priority from Japanese Patent Application No. 2004-062968 filed Mar. 5, 2004, which is hereby incorporated by reference herein.

The invention claimed is:

1. An image forming method which imparts two or more kinds of liquid compositions onto a recording medium to form an image on the recording medium, the method comprising the steps of:
   preparing a plurality of liquid compositions which include at least (a) a first liquid composition containing a functional substance, an anionic amphiphilic block polymer, and a liquid medium, and (b) a second liquid composition containing a functional substance, a polyvalent cation, an anionic amphiphilic block polymer, and a liquid medium; and
   imparting the first liquid composition and the second liquid composition onto the recording medium to bring the first liquid composition and the second liquid composition into contact with each other to cause at least one of these liquid compositions to thicken,
   wherein the anionic amphiphilic block polymer in the second liquid composition has a sulfonic acid group as an organic acid group,
   wherein the anionic amphiphilic block polymer in the second liquid composition contains a dioxyethylene unit structure, and
   wherein the functional substance in the second liquid composition is enclosed by the anionic amphiphilic block polymer in the second liquid composition.

2. The image forming method according to claim 1, wherein the polyvalent cation of the second liquid composition is a metallic cation.

3. The image forming method according to claim 1, wherein an organic acid formed by protonation to the anion of the anionic amphiphilic block polymer in the second liquid composition has a pKa of 2 or less.

4. The image forming method according to claim 1, wherein the anion of the anionic amphiphilic block polymer in the first liquid composition is a carboxylate anion.

5. The image forming method according to claim 1, wherein the amphiphilic polymer contains a repeating structure of a monomer unit composed of an alkenyl ether.

6. The image forming method according to claim 1, wherein the functional substance is a coloring material.

7. A pattern forming method which imparts a liquid composition containing a functional substance, to a pattern forming medium to form a pattern consisting of areas to which the functional substance has adhered, the method comprising the steps of:
   preparing a plurality of liquid compositions which include at least (a) a first liquid composition containing a functional substance, an anionic amphiphilic block polymer, and a liquid medium, and (b) a second liquid composition containing a functional substance, a polyvalent cation, an anionic amphiphilic block polymer, and a liquid medium; and
   imparting the first liquid composition and the second liquid composition onto the pattern forming medium to bring the first liquid composition and the second liquid composition into contact with each other to cause at least one of these liquid compositions to thicken,
   wherein the anionic amphiphilic block polymer in the second liquid composition has a sulfonic acid group as an organic acid group,
   wherein the anionic amphiphilic block polymer in the second liquid composition contains a dioxyethylene unit structure, and
   wherein the functional substance in the second liquid composition is enclosed by the anionic amphiphilic block polymer in the second liquid composition.

8. The pattern forming method according to claim 7, wherein the liquid compositions are imparted by employing an ink-jet recording system.

9. A liquid-applying apparatus comprising:
   a liquid-applying means for causing energy to act on a plurality of liquid compositions to impart the plurality of liquid compositions onto a recording medium, the liquid compositions including at least (a) a first liquid composition containing a functional substance, an anionic amphiphilic block polymer, and a liquid medium, and (b) a second liquid composition containing a functional substance, a polyvalent cation, an anionic amphiphilic block polymer, and a liquid medium, and the first liquid composition and the second liquid composition being brought into contact with each other to cause at least one of these liquid compositions to thicken; and
   a driving means for driving the liquid-applying means,
   wherein the anionic amphiphilic block polymer in the second liquid composition has a sulfonic acid group as an organic acid group,
   wherein the anionic amphiphilic block polymer in the second liquid composition contains a dioxyethylene unit structure, and
   wherein the functional substance in the second liquid composition is enclosed by the anionic amphiphilic block polymer in the second liquid composition.

10. The image forming method according to claim 1, wherein the anionic amphiphilic block polymer in the second liquid composition has a repeating structural unit represented by the general formula (5):

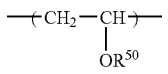

wherein $R^{50}$ represents $-X-(Y)_t-SO_3H$, $-X-(Y)_t-SO_3R^{10}$ or $-X-(Y)_tSO_3\text{-M}$; where X represents $-(CH(R^5)-CH(R^6)-O)_p-(CH_2)_m-(O)-$, p represents an integer of 1 to 20, m represents an integer of 0 to 36, n represents an integer of 1 or 0, Y represents a substituted or unsubstituted aromatic ring structure, t represents an integer of 0 to 10, and, where t is plural, each Y may be different, $R^{10}$ represents an alkyl group, M represents a monovalent or polyvalent cation, $R^5$ and $R^6$ each represents a hydrogen atom or an alkyl group, and $R^5$ and $R^6$ may be the same or different.

* * * * *